United States Patent [19]

Hicks et al.

[11] Patent Number: 5,072,254
[45] Date of Patent: Dec. 10, 1991

[54] PHOTOGRAPHIC PRINTER ASSEMBLY

[76] Inventors: Ray Hicks, 2605 Corunna Rd., Flint, Mich. 48503; Rick Israel, 4835 6th St. N., Minneapolis, Minn. 55440

[21] Appl. No.: 646,149

[22] Filed: Jan. 25, 1991

[51] Int. Cl.$^5$ .................. G03B 27/48; G03B 27/50
[52] U.S. Cl. ................................ 355/50; 352/235; 355/64; 355/72
[58] Field of Search .............. 355/50, 51, 72, 64; 352/235

[56] References Cited

U.S. PATENT DOCUMENTS 5,006,887  4/1991  Ogura ..................................... 355/72

Primary Examiner—Richard A. Wintercorn
Attorney, Agent, or Firm—Krass & Young

[57] ABSTRACT

A spool assembly for use in a printer assembly which allows substantially the entire web of photographic paper to be exposed in the printing process. The printer assembly includes a web, a printer operative to expose photographic images on portions of the web, and a drive means operative to systematically convey the web of photographic paper through the printer. Extender strips of non-photographic material are attached to the ends of the web of photographic paper to allow the end of the web proximate the respective extender strip to be positioned within the printer for exposure purposes. The spool assembly includes a spool formed of a plastic material and a retaining clip mounted thereon to engage the related extender strip. The spool is adapted to maintain the paper in a rolled configuration and are preferably constructed with a central portion of reduced diameter which contains a retaining clip. This arrangement provides a convenient assembly operative to expose substantially the entire length of photographic paper.

27 Claims, 2 Drawing Sheets

FIG-1
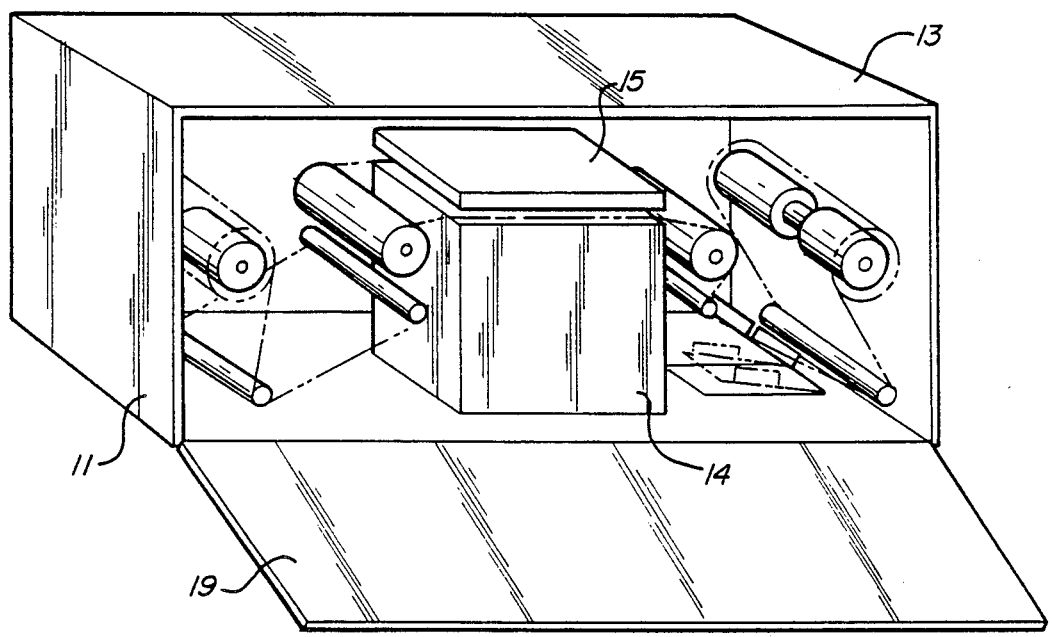
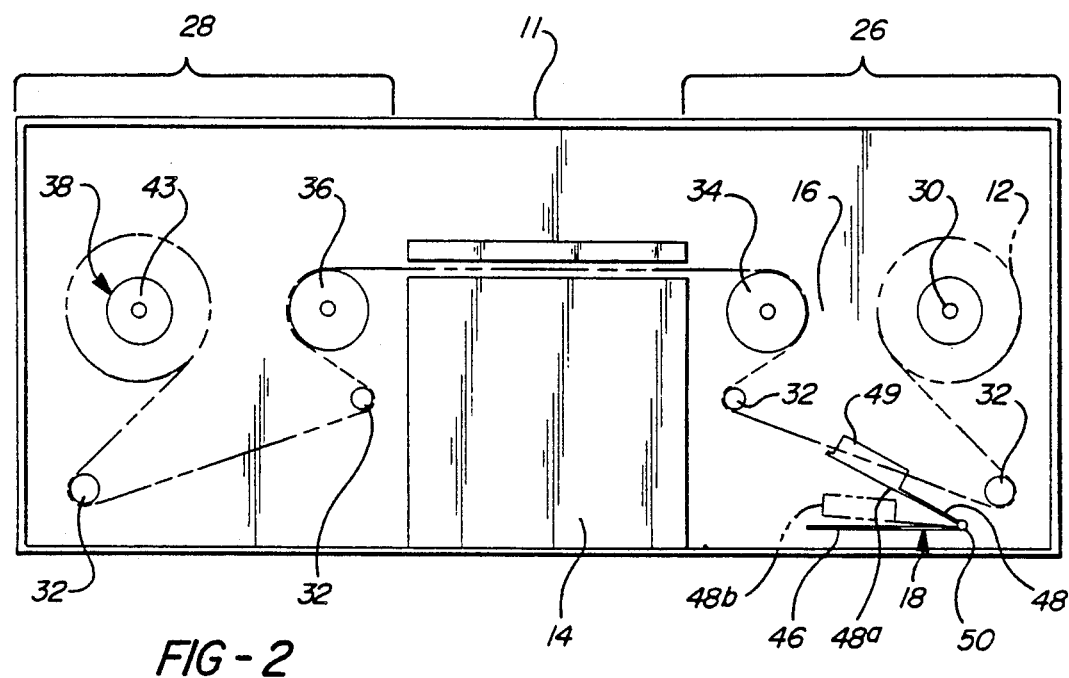
FIG-2

PHOTOGRAPHIC PRINTER ASSEMBLY

FIELD OF THE INVENTION

The present invention relates to a photographic printer assembly and, more specifically, to a photographic paper and spool assembly for use in the photographic printer assembly.

BACKGROUND OF THE INVENTION

Commercial photographic printing assemblies process large volumes of negative film by sequentially creating a series of photographic prints in correspondence with a series of negative images. Generally, an enclosure houses a drive system which systematically conveys a web of photographic paper through a printer positioned within the housing. The enclosure is typically opaque to allow the exposure process to occur in a darkened environment. The drive system includes a series of spools and rollers which cooperate to direct the web of photographic paper to and from the printer. More specifically, a feed spool, adapted to retain the unexposed photographic paper in a rolled configuration, and a series of rollers cooperate to direct the unexposed paper along a feed path to the printer. After being exposed in the printer, the photographic paper is guided along a delivery path to a take-up spool which retains the exposed photographic paper in a rolled configuration for further processing.

Typically, the feed and take-up spools comprise cardboard tubes on which the photographic paper is directly wound. Initially, the photographic paper is attached to a feed spool and wound thereon. The feed spool is inserted on a spindle carried by the housing of the printer assembly and the leading edge of the photographic paper is threaded through the feed path, printer and delivery path and affixed to a take-up spool similarly mounted in the assembly. In this manner, the web is attached to both the feed spool and take-up spool prior to the printing process to ensure proper movement of the paper. In use, the drive system incrementally advances the web of photographic paper through the printer. A length of negative film is likewise advanced within the printer, and a series of photographic images are exposed on the previously unexposed photographic paper. The drive system, therefore, also operates to wind the exposed photographic paper on the take-up spool.

Several problems exist with the previously described system. First, rotation of the cardboard spools on the spindles produces dust particles inside the opaque enclosure which can contaminate the photographic negative surface and adversely affect the exposure process. Secondly, the end portions of the web of photographic paper cannot be exposed in the printer since the web is attached directly to both the feed spool and take-up spool. More specifically, a portion of the photographic paper located at the leading end of the web and generally corresponding in length to the length of the delivery path is wasted as it is initially threaded and disposed beyond the exposure stage of the printer. Likewise, a portion of the photographic paper located at the trailing end of the web and generally corresponding in length to the length of the feed path is wasted as it remains along the feed path at the end of the printing process and never reaches the exposure stage of the printer.

SUMMARY OF THE INVENTION

The present invention provides a spool assembly of relatively simple and inexpensive construction for use in a printer assembly. The printer assembly includes a web of photographic paper, a printer operative to expose photographic images on portions of the web, and a drive means operative to systematically convey the web through the printer. The spool assembly of the present invention allows substantially the entire web to be exposed by the printer.

According to an important feature of the invention, an extender strip of non-photographic material is attached to one end of the web and cooperates with the drive means to position the portion of the web proximate that end in the printer. This arrangement operates to ensure that the portion of the web proximate the end to which the extender strip is attached is not wasted during the exposure process. The extender strip also provides proper processor drag co-efficient to allow the paper processor normal drying function.

According to a further feature of the invention, a first extender strip is attached to the leading edge of the web and a second extender strip is attached to the trailing edge This arrangement operates to ensure that the both end portions of the web are not wasted in the exposure process.

In the preferred embodiment, an extender strip attached to the leading edge of the web has a length at least as long as the delivery path defined within the printer assembly between the exit of the printer and the take-up spool. This arrangement ensures that the leading portion of the web proximate can be fully positioned within the printer.

In the preferred embodiment, an extender strip attached to the trailing edge of the web has a length at least as long as the feed path defined within the printer assembly between the feed spool and the entrance to the printer. This arrangement ensures that the trailing portion of the web proximate can be fully positioned within the printer.

According to a further feature of the invention, at least one of the spools has a retaining clip mounted on the exterior thereof. This arrangement secures the end of the web, and more particularly the extender strip, to the spool to retain the web in a rolled configuration. In the preferred embodiment, the retaining clip opens in a direction normal to the spool axis and comprises a unitary piece of spring steel formed in a substantially U-shaped configuration.

According to an important feature of the invention, the spool comprises three coaxially aligned portions, wherein the center portion has a diameter less than the diameter of the end portions. The retaining clip is secured on the exterior of the center portion and lies below the surface of the end portions. This arrangement allows the extender strip, which is attached to the retaining clip, to accumulate at the center portion of the spool, and further allows the photographic paper to bear on the end portions without unduly bearing on the retaining clip or extender strip which could damage the surface of the photographic paper.

According to a further feature of the invention, the spool is formed from a rigid plastic material. This arrangement eliminates the dust particles associated with the use of cardboard spools rotatably mounted on spindles in the printer assembly According to a further feature of the invention, the printer assembly includes a moveable guide means disposed proximate the feed path which is adapted to move between an operative position along the feed path for use in orienting the extender strip on the web in relation to the drive means and an inoperative position removed from the feed path so as not to interfere with the operation of the printer assembly. In the preferred embodiment, the guide means is positioned to be used with an extender strip attached to the leading edge of the web. The guide means operates to ensure that the extender strip is properly oriented parallel with and central to the web so as to prevent damage to the photographic paper due to alignment problems.

According to an important feature of the invention methodology, a portion of a web is exposed in a printer assembly by attaching an extender strip of non-photographic material to one end of the web which cooperates with the drive system to position that end portion of the web in the printer. This method ensures that the portion of the web proximate that end is not wasted in the exposure process.

According to a further feature of the invention methodology, a first extender strip is attached to the leading edge of the web and a second extender strip is attached to the trailing edge of the web. This method ensures that the portions of the web proximate both ends are not wasted in the exposure process.

BRIEF DESCRIPTION OF THE DRAWINGS

These and other objects and aspects of the invention will become apparent in the detailed description of the invention hereinafter with respect to the drawings in which:

FIG. 1 is a perspective view of the invention photographic printer assembly;

FIG. 2 is a cross sectional, side view of the invention photographic printer assembly;

DETAILED DESCRIPTION OF THE PREFERRED EMBODIMENT

Figure 3:
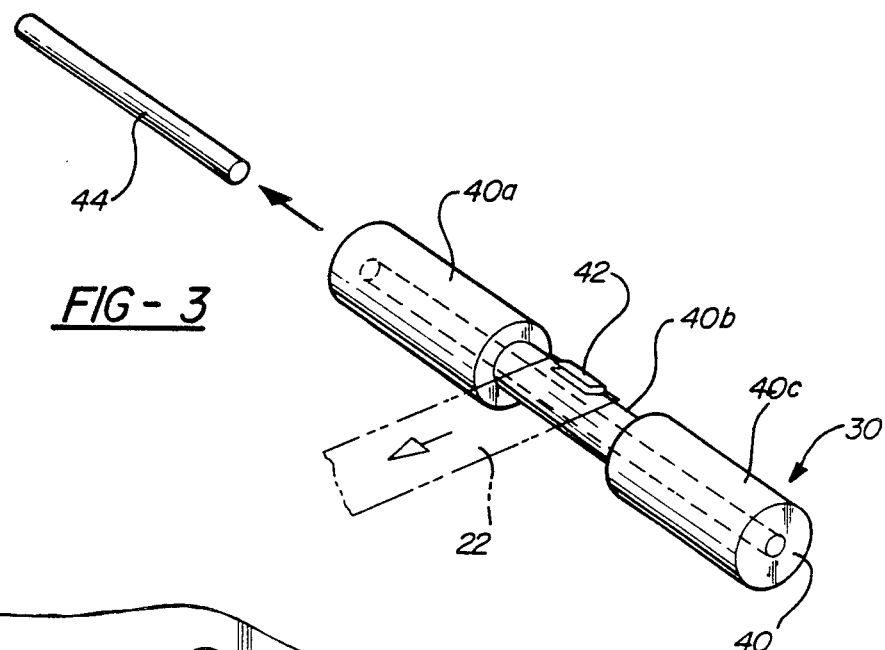
FIG. 3 is a perspective view of a paper spool assembly utilized in the invention photographic printer assembly.

The present invention provides a photographic printer assembly 10 which uses spool assemblies of relatively simple and inexpensive construction which allow substantially the entire web of photographic paper to be exposed in the printing process.

With reference to FIGS. 1 and 2, the photographic printer assembly 10 of the present invention includes an opaque housing 11, a photographic paper assembly 12, a printer 14 operative to expose photographic images on portions of the paper assembly 12, a platen 15 operative to position the paper assembly 12 relative the printer 14, a drive means 16 operative to systematically convey the photographic paper assembly 12 through the printer 14, and a guide means 18 operative to initially align the photographic paper assembly 12 in relation to the drive means 16.

The housing 11 typically includes a boxlike main body member 13 and a pivotable door element 19 which allows access to the internal components of the printer assembly 10 while providing a darkened environment during the exposure process. Spindles 44 project in rigid cantalever fashion from the back wall of the body member 13 for engagement with the drive means 16.

Figure 5:
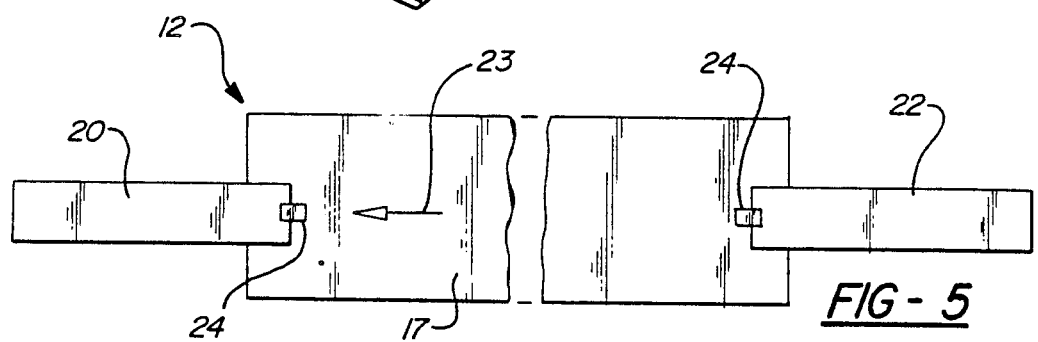
FIG. 5 is a plan view of the photographic paper assembly utilized in the invention photographic printer assembly.

With reference also to FIG. 5, the photographic paper assembly 12 includes the web of photographic paper 17, a leading extender strip 20, and a trailing extender strip 22. The paper assembly 12 moves through the printer assembly in the direction of arrow 23. The extender strips 20,22 are reusable and are formed from a non-photographic material, such as mylar, which attach to the web of photographic paper 17 by photographic chemical contaminant-free adhesive tape 24. The adhesive tape 24 is preferably chemically neutral so as not to interact with emulsion side of the web of photographic paper 17. The metal clip with one full wrap (360 degrees) of the extender strip 22 will withstand the torque created in the normal printer paper drive.

The drive system 16 is divided into two operative sections: a feed assembly 26 operative to deliver the unexposed photographic paper web 17 to the printer 14, and a take-up assembly 28 operative to receive the web 17 after being exposed by the printer 14. The feed assembly 26 includes a feed spool assembly 30, a pair of tensioning rollers 32, and a metering drive roller 34. The take-up assembly 28 includes a secondary drive roller 36, a pair of tensioning rollers 32, and a take-up spool assembly 38.

With reference also to FIG. 3, the feed spool assembly 30 includes a spool 40 and retaining clip 42. The spool 40 comprises a substantially cylindrical tube formed from a rigid plastic material and having three coaxially aligned portions 40A, 40B, 40C. Portions 40A, 40C are positioned at the ends of the spool and preferably have a diameter of approximately 1 inch, and the center portion 40B has a diameter less than the 1 inch diameter of the end portions 40A, 40C. This difference in diameters produces an annular trough which correbsponds to center portion 40B wherein the extender strip 22 is wound. The inner diameter of the trough is defined by the outer diameter of middle portion 40B, and the outer diameter of the trough is defined by the outer diameter of end portions 40A, 40C. A substantially U-shaped retaining clip 42 formed from a piece of spring steel is secured to the exterior of the center portion 40B so that the outwardmost surface of the retaining clip 42 lies below the outwardmost surface of the end portions 40A, 40C. The retaining clip is oriented to open in a direction normal to the spool axis so as to allow the trailing extender strip 22 to engage the retaining clip 42 and roll around the relatively narrow center portion 40B of the feed spool 40. The web of photographic paper 17 will then bear on the exterior of end portions 40A, 40C without unduly bearing on the retaining clip 42 or previously wound trailing extender strip 22. In fact, the trailing extender strip 22 typically fills the annular trough of center portion 40B, such that a relatively uniform surface having a diameter substantially the same as end portions 40A, 40C is formed. In this manner,. the web 17 will evenly bear on the exterior of end portions 40A, 40C and the previously wound extender strip 22 on center portion 40B.

The feed spool 40 is adapted to engage the drive system 16 and is typically disposed on a spindle 44 for rotational motion about the spool axis. The feed assembly 26 operates to direct the web of photographic paper 17 from the feed spool 40 along a feed path to the printer 14. Tensioning rollers 32 are carried by the housing 11 and are positioned along the feed path to provide sufficient tension to the portion of the web of photographic paper 17 so that metering drive roller 34 also mounted in the housing 11 may advance the web 17 using to the frictional engagement of the web 17 thereon. The web of photographic paper 17 is thereby controllably advanced at predetermined known increments during the exposure process.

Figure 4:
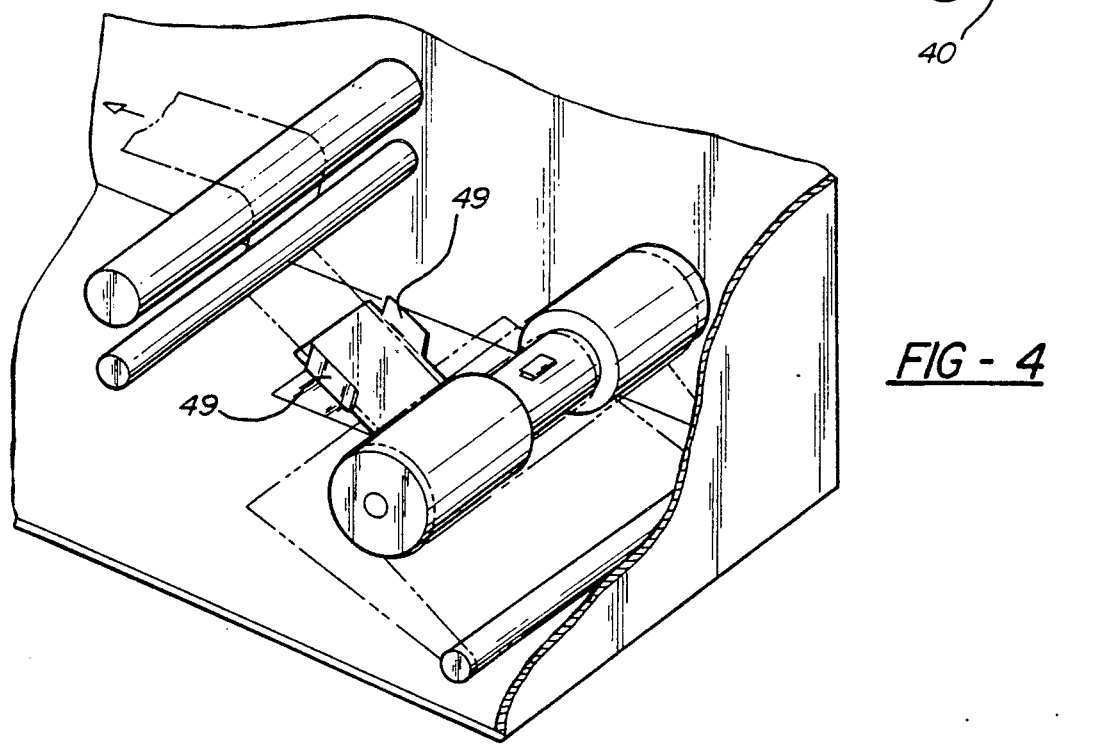
FIG. 4 is a fragmentary perspective view of the invention photographic printer assembly.

The take-up assembly 28 operates to direct the exposed web of photographic paper 17 from the printer 14 along a delivery path to the take-up spool assembly 38. The take-up spool assembly 38 includes a take-up spool 43 and retaining clip 42. The spool 43 is constructed similarly to the feed spool 30, so as to include a retaining clip 42 and is operative to engage the leading end of the leading extender strip 20 and wind the exposed photographic paper 12 thereon. Further, the take-up spool 43 is also disposed on a spindle 44. Tensioning rollers 32, carried by the housing 11 and positioned along the delivery path, support the portion of the web of photographic paper 17 to provide sufficient tension for operation of secondary drive roller 36 mounted on the housing 11 and to insure that the exposed paper 17 is properly wound on the take-up spool 43. The exposed web of photographic paper 17 is retained in a rolled configuration thereon for further processing With reference also to FIG. 4, the guide means 18 is disposed proximate the feed path and includes a base plate 46 and a guide plate 48 pivotably interconnected by hinge 50. The guide plate 48 includes a planar portion 47 and a pair of upwardly extending side portions 49 attached at opposite sides of the planar portion 47.

The base plate 48 attaches to the floor of the housing 11 and allows the guide plate 48 to pivot about the axis of hinge 50. The guide plate 48 is adapted to move between a raised operative position 48A along the feed path for use in orienting the leading extender strip 20 on the web 17 in relation to the drive means 16 and a lowered inoperative position 48B removed from the feed path so as not to interfere with the operation of the printer assembly. The guide means 18 is further positioned within the housing 11 so that a path defined across the top of the guide plate 48 between the upwardly extending side portions 49 when the upper plate 48 is disposed in its raised operative position 48A lies along a central portion of the feed path. Thus, the guide 16 automatically provides the means to ensure that the extender strip 20 is properly oriented on the web 17 to maintain the alignment of the web 17 in relation to the drive means 16 by placing the extender strip on the guide plate 48. This prevents damage to the photographic paper 17 during operation of the printer assembly due to misalignment with the apparatus.

In operation, the present invention uses the following method of exposing the web of photographic paper 17 in a printer assembly 10. A leading extender strip 20 is attached to the leading edge of the web of photographic paper 17 and has a length at least as long as the delivery path of the take-up assembly 28. A trailing extender strip 22 is attached to the trailing edge of the web of photographic paper 17 and has a length at least as long as the feed path of the feed assembly 26. Thus, the web of photographic paper 17 and the extender strips 20,22 form a photographic paper assembly 12 which is wound on the feed spool 40. The feed spool 40 and take-up spool 43 are positioned in the printer assembly on spindles 44, and the photographic paper assembly 12 is unwound from the feed spool 40, threaded through the feed path, printer 14 and delivery path, and the leading end of the leading extender strip 20 is attached to the retaining clip 42 on the take-up spool 43 so as to position the leading edge of the photographic paper 17 proximate the printer 14. In operation, the web 17 is incrementally advanced through the printer assembly by coordinated operation of drive roller 34 and secondary drive roller 36 to sequentially expose portions of the photographic paper 17 to film in the printer 14 until the trailing edge of the photographic paper 17 is positioned proximate the entrance to the printer 14 and the trailing extender strip 22 extends from the printer 14 to the feed spool 40 along the feed path. In this manner substantially all of the web of photographic paper 17 may be exposed in the printer 14.

The guide means 18 is utilized during the step of threading the paper assembly 12 through the apparatus to align the attachment of at least the leading extender strip 20 to the web of photographic paper 17 by positioning the guide plate 48 in its operative position 48A in proximity to the feed path. Prior to threading the paper assembly 12 through the assembly, the leading extender strip 20 is positioned on the guide plate 48 between the upwardly extending members 49 so as to position the leading extender strip 20 substantially parallel with the web 17. Therefore, alignment of the web 17 in the drive means 16 is not disturbed by misalignment of the extender strip.

From the foregoing description of the preferred embodiment it can be seen that various alternative embodiments of the invention can be anticipated without departure from the scope of the invention as defined in the following claims.

I now claim:

1. A printer assembly of the type having a web of photographic paper, a printer operative to expose photographic images on portions of the web of photographic paper, and a drive means to systematically convey the web of photographic paper through the printer, characterized in that an extender strip of non-photographic material is attached to one end of the web of photographic paper and said drive means is operative in cooperation with said extender strip to position the portion of the web of photographic paper proximate said one end in said printer.

2. The assembly of claim 1, wherein
a first extender strip is attached to the leading edge of the photographic paper web and a second extender strip is attached to the trailing edge of the photographic paper web.

3. The assembly of claim 1, wherein
said drive means includes a take-up spool operative to maintain the web of photographic paper in a rolled configuration after being exposed in the printer; and
the extender strip is attached to the leading edge of the web of photographic paper and has a length at least as long as the delivery path defined within the printer assembly between the exit of the printer and the take-up spool.

4. The assembly of claim 1, wherein
said drive means includes a feed spool operative to maintain the web of photographic paper in a rolled configuration prior to being exposed in the printer; and
the extender strip is attached to the trailing edge of the web of photographic paper and has a length at least as long as the feed path defined within the printer assembly between the feed spool and the entrance to the printer.

5. The assembly of claim 1, wherein the drive means includes a spool assembly including a substantially cylindrical, tubular spool operative to retain the web of photographic paper in a rolled configuration, and a retaining clip secured to the exterior of the spool between the ends of the spool.

6. The assembly of claim 5, wherein said tubular spool is formed from a substantially rigid plastic material.

7. The assembly of claim 5, wherein said retaining clip opens in a direction normal to the spool axis.

8. The assembly of claim 5, wherein said retaining clip comprises a unitary piece of spring steel formed in a substantially U-shaped configuration.

9. The assembly of claim 5, wherein said spool comprises three coaxially aligned portions including a first end portion, a middle portion and a second end portion, said first and second end portions have a fixed diameter, and said middle portion has a diameter less than the diameter of said end portions; and said retaining clip is disposed on the exterior of said middle portion.

10. The assembly of claim 5, wherein said drive means further includes at least one roller operative to direct the photographic paper web along a feed path extending from said tubular spool to the printer; said extender strip is attached to the leading edge of the photographic paper web; and said printer assembly further includes a moveable guide means disposed proximate said feed path and adapted to move between an operative position along said feed path for use in orienting the extender strip on said web in relation to said drive means and an inoperative position removed from said feed path so as not to interfere with the operation of the printer assembly.

11. The assembly of claim 10, wherein said guide means comprises a guide plate mounted for pivotable movement between said operative and inoperative positions, and a pair of side members extending perpendicularly from opposite sides of said guide plate so as to be positioned on either side of said extender strip when said extender strip passes over said guide plate in said operative position.

12. The assembly of claim 1, wherein said extender strip is mylar.

13. A printer assembly of the type having a printer operative to systematically expose photographic images on portions of a web of photographic paper and a drive means operative to convey the web of photographic paper through the printer and including at least one substantially cylindrical, tubular spool retaining the web of photographic paper in a rolled configuration, characterized in that the spool is formed from a plastic material and includes a retaining clip disposed on the exterior of the spool between the ends of the spool.

14. The assembly of claim 13, wherein said retaining clip opens in a direction normal to the spool axis.

15. The assembly of claim 13, wherein said retaining clip comprises a unitary piece of spring steel formed into a substantially U-shaped configuration.

16. The assembly of claim 13, wherein said spool comprises three coaxially aligned portions including a first end portion, a middle portion and a second end portion, said first and second end portions having a specific diameter, and said middle portion has a diameter less than the diameter of said end portions; and said retaining clip is disposed on the exterior of said middle portion.

17. A printer assembly of the type having a web of photographic paper, a printer operative to expose photographic images on portions of the web of photographic paper, a feed spool operative to retain the web of photographic paper in a rolled configuration, and a drive means to systematically convey the web of photographic paper to the printer along a feed path extending from the feed spool to the printer, characterized in that:
an extender strip of non-photographic material is attached to the leading edge of the web of photographic paper; and
said printer assembly further includes a moveable guide means disposed proximate said feed path and adapted to move between an operative position along said feed path for use in orienting the extender strip on said web in relation to said drive means and an inoperative position removed from said feed path so as not to interfere with the operation of the printer assembly.

18. A photographic printer assembly comprising:
a web of photographic paper;
a printer operative to expose photographic images on said web of photographic paper;
a tubular plastic feed spool operative to retain the web of unexposed photographic paper in a rolled configuration;
a drive roller positioned along a feed path extending from the feed spool to the entrance to the printer and operative to direct the web of photographic paper along said feed path;
an extender strip formed of non-photographic material connected to the leading edge of said web of photographic paper; and
a pivotable guide disposed proximate the feed path and adapted to pivot between an operative position along said feed path for use in orienting the extender strip on said web in relation to said feed path and an inoperative position removed from said feed path.

19. The assembly of claim 18, wherein said feed spool includes a retaining clip secured to the exterior of the spool between the ends of the spool.

20. The assembly of claim 19, wherein said retaining clip opens in a direction normal to the spool axis.

21. The assembly of claim 19, wherein said retaining clip comprises a unitary piece of spring steel formed in a substantially U-shaped configuration.

22. The assembly of claim 19, wherein said spool comprises three coaxially aligned portions including a first end portion, a middle portion and a second end portion, said first and second end portions have a fixed diameter, and said middle portion has a diameter less than the diameter of said end portions; and said retaining clip is disposed on the exterior of said middle portion.

23. A method of exposing a web of photographic paper in a printer assembly of the type including a printer and a drive system operative to convey the web of photographic paper through the printer, characterized in that the method includes the step of attaching an extender strip of nonphotographic material to one end of the photographic paper web, said extender strip having a sufficient length so as to cooperate with the drive system to position the portion of the photographic paper web proximate that end of the web for use in the printer.

24. A method according to claim 23, further characterized in that a first extender strip is attached to the leading edge of the photographic paper web and a second extender strip is attached to the trailing edge of the photographic paper web.

25. A method according to claim 23, characterized in that the method further includes the steps of:
   providing a feed spool in the drive system which is operative to retain the web of photographic paper in a rolled configuration prior to being exposed by the printer; and
   attaching an extender strip to the trailing edge of the web of photographic paper which has a length at least as long as the feed path defined within the printer assembly between the feed spool and the entrance to the printer.

26. A method according to claim 23, characterized in that the method further includes the steps of:
   providing a take-up spool in the drive system which is operative to retain the web of photographic paper in a rolled configuration after being exposed by the printer; and
   attaching an extender strip to the leading edge of the web of photographic paper which has a length at least as long as the delivery path defined within the printer assembly between the take-up spool and the exit of the printer.

27. A method of exposing a web of photographic paper in a printer assembly of the type including a feed spool, a take up spool, and a printer, and defining a feed path extending from the feed spool to the entrance to the printer and a delivery path extending from the exit of the printer to the take up spool, said method comprising the steps of:
   providing a web of photographic paper;
   attaching a leading extender strip to the leading edge of the web of photographic paper having a length at least as long as the delivery path, and attaching a trailing extender strip to the trailing edge of the web of photographic paper having a length at least as long as the feed path, to form a photographic paper assembly;
   winding the photographic paper assembly on the feed spool;
   unwinding the photographic paper assembly from the feed spool and attaching the leading end of the leading extender strip to the take up spool so as to position the leading edge of the photographic paper proximate the printer; and
   incrementally advancing the photographic paper through the printer assembly to sequentially expose portions of the photographic paper to film in the printer until the trailing edge of the photographic paper is positioned proximate the printer and the trailing extender strip extends from the printer to the feed spool.

* * * * *